United States Patent [19]

Tifft

[11] 3,958,819

[45] May 25, 1976

[54] ADJUSTABLE DROP OR RISER NIPPLE

[76] Inventor: William C. Tifft, 53 Swan Ave., Seymour, Conn. 06483

[22] Filed: Mar. 21, 1975

[21] Appl. No.: 560,751

[52] U.S. Cl. .................................. 285/302; 239/209; 285/356; 285/382.5

[51] Int. Cl.[2] ..................... A62C 37/08; F16L 15/02

[58] Field of Search ......... 285/302, 356, 338, 382.5, 285/382.4; 239/209, 203; 169/37; 29/522, 523

[56] References Cited

UNITED STATES PATENTS

| | | | |
|---|---|---|---|
| 1,078,129 | 11/1913 | Corrigan et al. | 285/356 X |
| 1,204,728 | 11/1916 | Arena | 285/302 |
| 1,872,089 | 8/1932 | McKee | 285/302 |
| 2,274,688 | 3/1942 | Griepenstroh | 285/356 X |
| 3,451,483 | 6/1969 | Van Houtte et al. | 285/302 X |
| 3,847,392 | 11/1974 | Horwinski | 285/302 |

FOREIGN PATENTS OR APPLICATIONS

| | | | |
|---|---|---|---|
| 172,461 | 8/1960 | Sweden | 285/382.5 |

*Primary Examiner*—Thomas F. Callaghan
*Attorney, Agent, or Firm*—H. Gibner Lehmann; K. Gibner Lehmann

[57] ABSTRACT

An adjustable drop or riser nipple for sprinkler systems and the like, characterized by few, simple parts and comprising short, telescoping inner and outer lengths of pipe having interposed between them a locking or drive ring which acts against an expansible, resilient sealing ring so as to lock the pipes in any of different adjusted axial positions as well as to seal the same to each other. The locking ring is part of an exposed nut threaded into the projecting end of the outer pipe. The outer pipe intermediate its ends has fixedly attached in it an abutment ring which engages one end of the resilient sealing ring in the pipe. The other end of the sealing ring is engaged by the locking ring in such a manner that when the latter is forcibly axially shifted by the act of tightening the nut, it radially expands or deforms the sealing ring, causing such ring to tightly grip both the inner and outer pipes whereby these are not only locked in an adjusted position but also sealed tightly to each other so as to prevent leakage of liquid. The inner end of the inner pipe carries a retainer ring of larger diameter than the abutment ring on the inner pipe, whereby the latter is held captive and cannot inadvertently drop from or be removed from the outer pipe. The exposed end of the inner pipe mounts the usual sprinkler head and heat-responsive valve normally provided on automatic fire-extinguishing sprinkler systems. The above telescopic arrangement enables adjustment of the nipple assemblage for length, so that it can be readily used where false or acoustic ceilings are being installed in existing factory or industrial structures. The adjustment and tightening of the nipple is readily effected from a location below the installed false or acoustic ceiling, by using a wrench on the exposed nut.

1 Claim, 7 Drawing Figures

ADJUSTABLE DROP OR RISER NIPPLE

BACKGROUND

This invention relates to extensible and retractable pipe joints or connections, and more particularly to adjustable pipe or nipple structures such as drop nipples for automatic fire-extinguishing sprinkler systems, riser nipples for lawn sprinklers and the like. Heretofore various types of telescopic, adjustable pipe joints or assemblies have been proposed and produced, intended for uses such as with lawn sprinklers, automatic overhead fire extinguishing sprinkler systems, etc. In general, these prior devices were intended for a specific initial construction, as part of an original structure or lay-out of job. In such cases the required sizes and dimensions were completely predetermined, and the components of the adjustable joint were therefore precut according to the specifications of the particular job. In the case of lawn sprinklers, the adjustable riser nipple would be installed before backfilling, and the adjustment then readily effected according to the level of the land. Thus, adjustment normally presented no problem.

In the case of remodeling of building structures employing automatic sprinkler systems, however, the installation of a false or acoustic ceiling made it necessary to cut and install longer drop nipples for the sprinkler heads. This was a tedious and time-consuming job, and represented a costly part of the work or installation. Efforts have been made to reduce the time and work involved, by the use of extensible pipe joints, but these were not satisfactory due to difficulty of on the job repair, because of the possibility of leakage, and also because the adjustment member in many instances was located above the false or acoustic ceiling, between the latter and the original ceiling. Such latter condition was inconvenient and not practical, since while it solved one problem it neglected other considerations and therefore often resulted in the creation of other problems.

Extensible or telescopic pipe joints and/or nipples for the above purposes have been proposed and produced in the past, but these prior devices were not especially satisfactory for the reason that they involved additional parts of a type which added considerably to the expense. The fabricating cost of the parts was not only considered commercially uneconomical, but the assembly expense was considerable as well as material costs.

SUMMARY

The above disadvantages and drawbacks of prior extensible nipples or pipe joints are obviated by the present invention, which has for its main object the provision of a novel and improved drop nipple for automatic fire extinguishing sprinkler systems wherein fewer and less costly parts and assemblies are involved while still enabling adjustment of the nipple to be readily effected from a location below newly installed ceilings. In the new drop nipple the sprinkler-head-carrying portion is still positively held captive and prevented from being inadvertently separated from the cooperable supporting pipe element, even though the construction has been simplified. The above object is accomplished by a novel nipple structure comprising short, outer and inner telescoping lengths of pipe between which there is interposed a short locking ring preferably constituted as part of a nut. The outer pipe intermediate its ends has a fixed annular abutment ring, and also carries an expansible resilient sealing ring at one end engaged with the abutment ring. The locking ring engages the other end of the sealing ring and is advanced by the nut, which threads on the outer pipe. By such arrangement, tightening of the nut will shift the locking ring so as to compress the expansible resilient sealing ring, causing the latter to forcibly engage both the inner and outer telescopic pipes, resulting in a fluid-tight seal therebetween as well as effecting a locking action to secure the pipes in adjusted position. The inner pipe at its inner end has a lock washer or ring characterized by a larger diameter than the abutment ring fixed in the outer pipe whereby the inner pipe is held captive and cannot be inadvertently dropped or slipped out of the outer pipe so as to be separated therefrom. The exposed end of the inner pipe can have threaded onto it a coupling adapted to receive a sprinkler head or other orifice-type device, as desired.

Other features and advantages of the invention will hereinafter appear.

Figure 1:
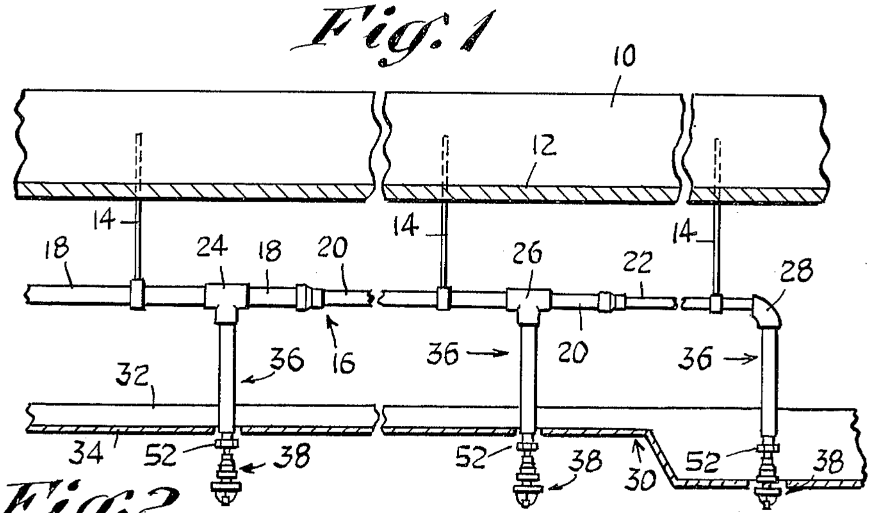
FIG. 1 is a diagrammatic representation of a portion of a building structure illustrating an original ceiling and a drop or false ceiling which is usually formed with acoustic tile, and illustrating further the incorporation of extensible drop nipples of the type provided by the invention.

Considering first FIG. 1 there is illustrated an existing building structure comprising ceiling joists 10 supporting an original ceiling 12. Carried by the ceiling 10, 12 are existing hangers 14 for a sprinkler system which comprises a distribution pipe 16 having sections or lengths 18, 20 and 22 of graduated or consecutively smaller diameters. The pipe sections 18, 20 and 22 are connected by reducer T's 24 and 26, and at the end of the pipe length 22 there is an elbow 28. Below the distribution pipe 16 of the sprinkler system there is a sub-ceiling 30 comprising a usual type of supporting framework 32 to the underside of which are attached acoustic ceiling panels 34.

In accordance with the present invention, novel and improved, adjustable drop nipples 36 of either thin-walled tubing or else thick-walled tubing or pipe are provided, attached to the T-fittings 24, 26 and to the elbow 28, such drop nipples being provided at their bottom ends with conventional sprinkler heads 38. Considering now FIGS. 2–5 there is illustrated one such drop nipple 36, comprising short, outer and inner lengths of telescoping thin-wall pipe or tubing 40, 42, the outer pipe at its top end being sweated into the T-fitting 24. It is apparent from the drawings that the outer pipe can be constituted of ordinary or stock piping, as well as the smaller diameter inner pipe. At its bottom end the inner pipe 42 is sweated into a coupling 46 carying the automatic valve and sprinkler head 38.

As provided by the invention, interposed between the outer and inner lengths of pipe 40, 42 there is a locking ring or bushing 48 which closely, slidably fits the inner pipe 42 and is preferably constituted as part of a nut 50 having a hexagonal head 52 to accommodate a wrench. Also, the upper end of the inner pipe 42 has fixedly secured thereto an annular retainer in the form of a split ring 54 adapted to slide along inside the inner surface of the outer pipe 40. A ring 60 (described below) and the bushing 48 act as bearing surfaces when the inner tube or pipe 42 is vertically adjusted in the outer tube or pipe 40.

Carried by the outer pipe 40 is an expansible resilient sealing ring 56 one end of which engages a packing washer 57 at the top end of the locking ring 48. The nut 50, 52 projects from the bottom end of the outer pipe 40, and is carried by internal threads 58 in the pipe.

Further, in accordance with the invention, the outer pipe 40 intermediate its ends is provided with a fixed internal abutment shoulder or ring 60 adapted to be engaged by the upper end of the sealing ring 56 and also to act as a guide for the inner pipe 42.

The internal diameter of the abutment ring provides for a sliding fit of the ring on the inner pipe 42. Also, the inside of the ring 60 is smaller than the outer diameter of the retainer washer 54 that is rigidly carried by the inner pipe 42 whereby the latter is held captive in the outer pipe. It will be seen that a clearance space 62 exists between the inside wall of the outer pipe 40 and the exterior of the inner pipe 42 to accommodate the split ring 54 and rings 50, 56 and 60.

By the above organization it is possible to readily adjust the nipple 36 for length by loosening the nut 50, 52 and sliding the inner pipe 42 within the rings 50, 56 and 60 either upward or downward, due to the sliding fits provided. When the desired length of the nipple is attained the nut 50, 52 is tightened, whereupon the locking ring 48 will be forced against the sealing ring 56 and will compress the same since it is backed up and prevented from sliding by the fixed abutment ring 60. Thus the sealing ring 56 will be forced radially against both the outer pipe 40 and the inner pipe 42. As a consequence, the two lengths of pipe 40, 42 will be securely locked in their adjusted positions against accidental shifting movement, and also will be securely sealed to each other to prevent any leakage of fluid or liquid therebetween.

Figure 7:
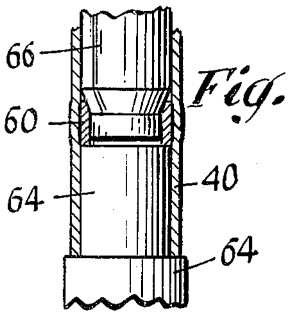
FIG. 7 is an axial sectional view of the outer nipple pipe arranged with tooling to affix an abutment ring to it.

In accordance with the present invention the outer tube or pipe 40 and its internal abutment ring 60, when these are of ductile metal, are constructed in a unique manner. Referring to FIG. 7, the pipe 40 is placed over an upstanding stud or anvil 64 on which the ring 60 rests. Initially the ring 60 has a sliding fit in the pipe 40, to enable it to be readily pushed into the pipe to the desired location. After this has been done, a punch 66 or expansion roller (not shown) is made to descend into the pipe, so as to engage an internal taper 68 or diameter of the ring. The punch 66 (or expansion roller) is then forced downward through a short working stroke while the ring 60 rests on the anvil 64. This causes the ring to spread radially, making a bulge in the outer tube and causing the ring to be securely trapped therein. Optionally the exterior of the outer pipe 40 can be supported above and below the budging point by a split die (not shown) during the securement of the ring 60.

Referring to FIG. 1 it will be seen that the locking nuts 50, 52 are preferably located below the false or acoustic ceiling 30 whereby these are readily accessible for loosening and tightening. Or the nuts 50, 52 can be located above the ceiling 34 but readily reached by a wrench adapted to easily engage the hexagonal portion of the nuts. Accordingly, the nipples 36 can be adjusted for proper length even though the acoustic ceiling 30 is already in place, since the adjustment involves operation of the exposed nuts and shifting of the inner pipe length 42, the latter by applying force to the sprinkler heads 38. When the desired adjustment is effected it merely becomes necessary to again tighten the nuts 50, 52 in order to lock and seal the nipples in the desired positions.

By the provision of the detent ring 54 on the length of inner pipe 42 there is positively prevented any dropping out or removal of the latter from the nipple since it will encounter the backing or abutment ring 60, and this constitutes an important safety feature of the invention.

Figure 6:
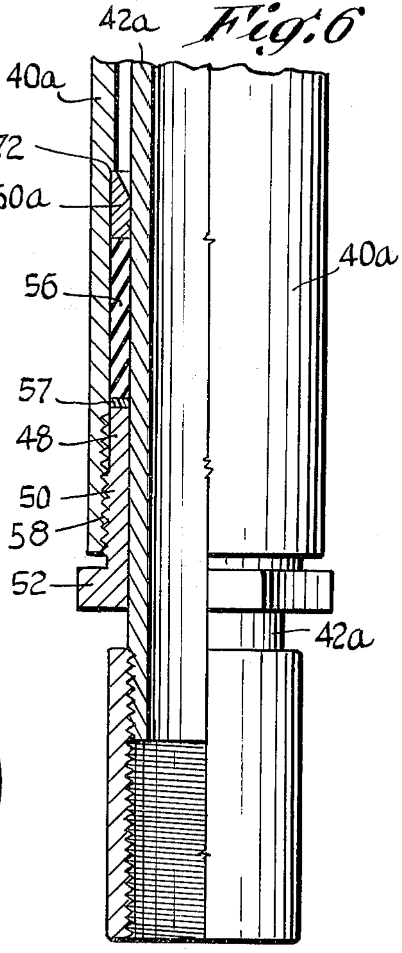
FIG. 6 is a view like that of FIG. 2, illustrating another embodiment of the invention.

Another embodiment of the invention is illustrated in FIG. 6, which shows tubular members 40*a* and 42*a* constituted of iron pipes. In this construction the outer pipe 40*a* is not bulged outward to contain the abutment ring 60*a*. Instead, the lower portion of the bore of the pipe 40*a* is reamed or cleaned out slightly by a suitable reamer which leaves a slight shoulder in the pipe bore. The abutment ring 60*a* has a tight press fit in the reamed bore portion, and is forced therein to the point where it abuts the shoulder 72. This completes the assembly of the ring into the pipe. In other respects the embodiment of FIG. 6 is similar to that of FIGS. 1–5 and functions in a like manner.

Figure 2:
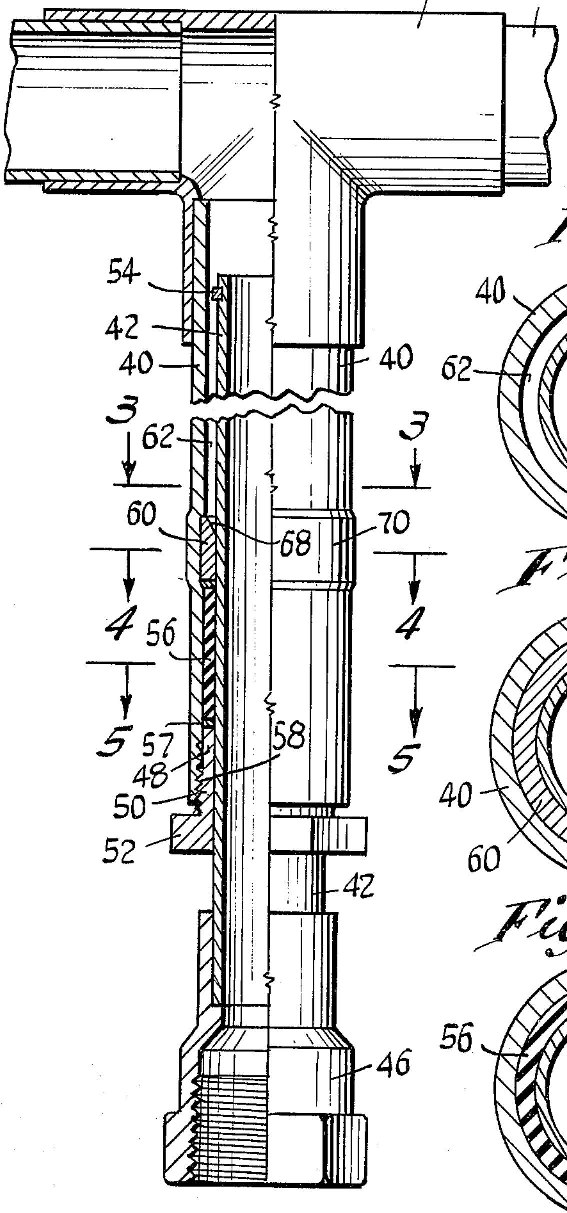
FIG. 2 is an axial sectional view of a drop nipple and portion of the sprinkler system, illustrating various structural details.
Figure 3:
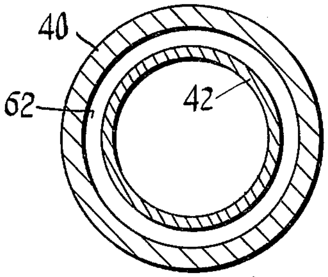
FIG. 3 is a transverse section taken on the line 3—3 of FIG. 2.
Figure 4:
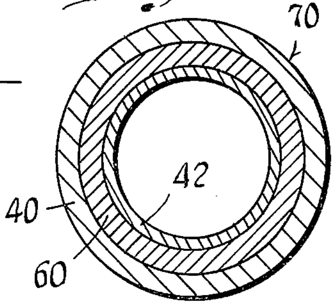
FIG. 4 is a transverse section taken on the line 4—4 of FIG. 2.
Figure 5:
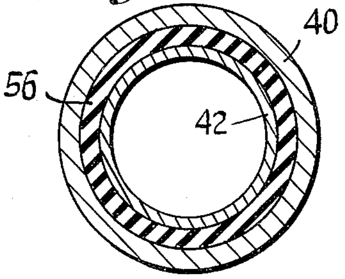
FIG. 5 is a transverse section taken on the line 5—5 of FIG. 2.

An important feature of the invention is that the inner pipe or tube 42 can have a lower portion exposed, as seen in FIG. 2, whereby it can be gripped by a wrench or suitable tool and held against turning, in the event that it becomes necessary to tighten or replace a defective coupling or sprinkler head. Thus easier servicing of the nipple is possible. Moreover, the length of drop or adjustment is only limited by that length of the inner pipe 42 which is disposed above the abutment 60 when the pipe is in the raised position. No additional length is required of the ring or bushing 48, to extend the adjustment range. In other words, the present nipple construction does not require a long locking sleeve as with certain prior extension nipples, or retainer nuts and the like. The nipple can be sold without the coupling 46, since the accessibility of the inner pipe 42 makes it possible to attach any type of fitting or sprinkler head. Less sealing pressures are required than with prior extension nipples where the inner pipes must present larger areas to the pressurized fluid due to the type of seal employed.

As seen in FIG. 1, the false ceiling can be below the nut 50, in which event a suitable wrench will be employed to loosen and tighten the nut when adjustment is required. The entire nipple can be installed in inverted position, in those places where risers are indicated, for example. Lawn sprinkler systems and the like can utilize the nipples of the present type, as will be understood.

It will now be seen from the foregoing that I have provided novel and improved retractable and extensible drop or riser nipples for automatic fire entinguishing sprinkler systems, lawn sprinkler systems and the like, wherein relatively few and inexpensive parts are involved, wherein adjustment of the nipples can be readily effected from a location adjacent the sprinkler head, and wherein the fabrication and assembly of the components can be quickly and readily effected, the cost being held to an especially low figure.

Variations and modifications are possible without departing from the spirit of the invention.

I claim:

1. A low cost adjustable drop or riser nipple construction for fire-extinguisher sprinkler systems, comprising in combination:

a. a pair of relatively axially movable inner and outer telescoping pipes, said pipes being constituted of pieces of thin-walled tubing capable of being bulged radially outward, with the inner piece being receivable in the smallest internal diameter of the outer piece, b. said outer pipe being constituted of ductile metal and having a through bore, and being adapted at one end for attachment to a fire-extinguisher sprinkler system to receive extinguishing fluid therefrom, c. said outer pipe having a portion of larger internal diameter than the remainder of the pipe, d. internal screw threads at the other end of said outer pipe, e. a nut surrounding the inner pipe and having external screw threads engaged with said internal screw threads, f. said nut having a bushing portion on which said external threads are disposed, located between said pipes and adapted to be longitudinally shifted as the nut is screwed into said internal screw threads, g. a yieldable sealing ring disposed between said pipes and engagable with said bushing portion so as to be subjected to axial force therefrom, and h. an abutment ring constituted of ductile metal, disposed between said pipes and rigidly and immovably secured in the larger internal diameter portion of the outer pipe, i. said abutment ring being engaged with the sealing ring and constituting a backing for the latter whereby force applied by the bushing portion of the nut causes the sealing ring to press and seal against the pipes, j. said abutment ring being permanently mechanically tightly fitted into the outer pipe against axial dislodgement, said outer pipe and ring being outwardly bulged by flowing of the metals thereof so as to hold captive the abutment ring in the bulge of the tubing.

* * * * *